United States Patent
Yang et al.

(10) Patent No.: US 9,264,963 B2
(45) Date of Patent: Feb. 16, 2016

(54) USER EQUIPMENT AND METHOD FOR ENHANCED UPLINK POWER CONTROL

(71) Applicant: Intel Corporation, Santa Clara, CA (US)

(72) Inventors: Rongzhen Yang, Shanghai (CN); Hujun Yin, Saratoga, CA (US); Xiaogang Chen, Beijing (CN); Jong-kae Fwu, Sunnyvale, CA (US); Qinghua Li, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 240 days.

(21) Appl. No.: 13/971,971

(22) Filed: Aug. 21, 2013

(65) Prior Publication Data

US 2015/0055454 A1    Feb. 26, 2015

(51) Int. Cl.
| | | |
|---|---|---|
| H04W 4/00 | (2009.01) |
| H04W 36/22 | (2009.01) |
| H04W 52/34 | (2009.01) |
| H04W 52/14 | (2009.01) |
| H04W 52/24 | (2009.01) |

(52) U.S. Cl.
CPC ............ *H04W 36/22* (2013.01); *H04W 52/346* (2013.01); *H04W 52/146* (2013.01); *H04W 52/244* (2013.01)

(58) Field of Classification Search
USPC .................................. 370/329, 330, 331, 338
See application file for complete search history.

(56) References Cited

U.S. PATENT DOCUMENTS

2012/0300715 A1* 11/2012 Pelletier et al. ............... 370/329

FOREIGN PATENT DOCUMENTS

| JP | 2013118619 A | 6/2013 |
|---|---|---|
| KR | 20120014880 A | 2/2012 |
| KR | 1020120010188 A | 2/2012 |
| KR | 20120130100 A | 11/2012 |
| WO | WO-2015026943 A1 | 2/2015 |

OTHER PUBLICATIONS

"3rd Generation Partnership Project; Technical Specification Group Radio Access Network; Evolved Universal Terrestrial Radio Access (E-UTRA); User Equipment (UE) radio transmission and reception (Release 10)", 3GPP TS 36.101 V10.11.0, (Jul. 2013), 362 pgs.

(Continued)

*Primary Examiner* — Zewdu A Beyen
(74) *Attorney, Agent, or Firm* — Schwegman Lundberg & Woessner, P.A.

(57) ABSTRACT

Embodiments of user equipment and methods for improved uplink transmission power management and scheduling, are generally described herein. For example, in an aspect, a method of uplink power management is presented, the method includes determining whether a total desired transmission power exceeds a total configured maximum output power for a subframe. When the total desired transmission power exceeds the total configured maximum output power, the method includes allocating a minimum proactive power limitation to each serving cell, assigning a remaining power to one or more channels based on priority, and computing a total power assignment based on the allocating and the assigning.

17 Claims, 4 Drawing Sheets

(56) References Cited

OTHER PUBLICATIONS

"Evolved Universal Terrestrial Radio Access (E-UTRA); Physical layer procedures", 3GPP TS 36.213 V10.6.0. Technical Specification Group Radio Access Network. Release 10., (Jun. 2012), 1-125.
"Final Report of 3GPP TSG RAN WG1 #72 v1.0.0", R1-130861, (Apr. 2013), 91 pgs.
"International Application Serial No. PCT/US2014/051892, International Search Report mailed Nov. 19, 2014", 3 pgs.
"International Application Serial No. PCT/US2014/051892, Written Opinion mailed Nov. 19, 2014", 6 pgs.
"The Agenda of 3GPP TSG RAN WG1 Meeting #72", R1-130355, (Feb. 2013), 5 pgs.

\* cited by examiner

USER EQUIPMENT AND METHOD FOR ENHANCED UPLINK POWER CONTROL

TECHNICAL FIELD

Embodiments described herein pertain generally to wireless communications and in particular to methods and apparatus for uplink power control enhancement in Long-Term Evolution Advanced (LTE-A, LTE-Advanced) communications environments.

BACKGROUND

Mobile devices (e.g. user equipment (UE)) in heterogeneous network environments, such as LTE-Advanced network environments, may simultaneously communicate with multiple access points, which may include a primary access point, or PCell, and one or more secondary access points, or SCells. In some systems, a macro cell may serve as the PCell, the primary access point governing mobility and other control processes, and one or more SCells (small cells or other macro cells) may serve as the one or more secondary access points that are utilized for data offloading. In such example systems, the maximum transmission power for a mobile device in a subframe can be easily reached by transmitting control messages to the PCell, leaving little to no power for data transmission to the SCells. Thus, there is a need for improved power allocation management in heterogeneous network environments.

DETAILED DESCRIPTION

The present disclosure presents example methods and apparatuses for improved uplink power control in LTE-Advanced wireless environments, wherein a UE may communicate with multiple cells, including a PCell and one or more SCells, over multiple component carriers using carrier aggregation (CA). In such environments, some examples of the improved uplink power control methods and apparatuses described herein may be based on a power allocation tradeoff strategy using a Minimum Proactive Power Limitation (MPLL) per component carrier, $P_{CMIN,c}$. In an aspect, if the total transmit power of a UE in a subframe i over all cells and all component carriers would exceed a linear value of a configured maximum output power $\hat{P}_{CMAX}(i)$, the UE may assign $P_{CMIN,c}$ first to each serving cell c in subframe i, and the remaining power would be assigned to uplink channels, whether PCell or SCell channels, or control or data channels, based on priority. In some examples, this priority may be given first to a physical uplink control channel (PUCCH) (e.g. uplink channel to the primary macro cell, or PCell), then to a physical uplink shared channel (PUSCH) with downlink control information (DCI) (e.g. an uplink channel to the primary macro cell), and then to a PUSCH without DCI (e.g. an uplink channel to one or more SCells. This prioritization allows UEs in LTE-Advanced environments to offload data uplink transmissions to SCells (e.g. via PUSCH) while ensuring that necessary control signaling with the PCell remains intact in the uplink (e.g. via PUCCH), even in a restrictive UE power condition.

Figure 1:
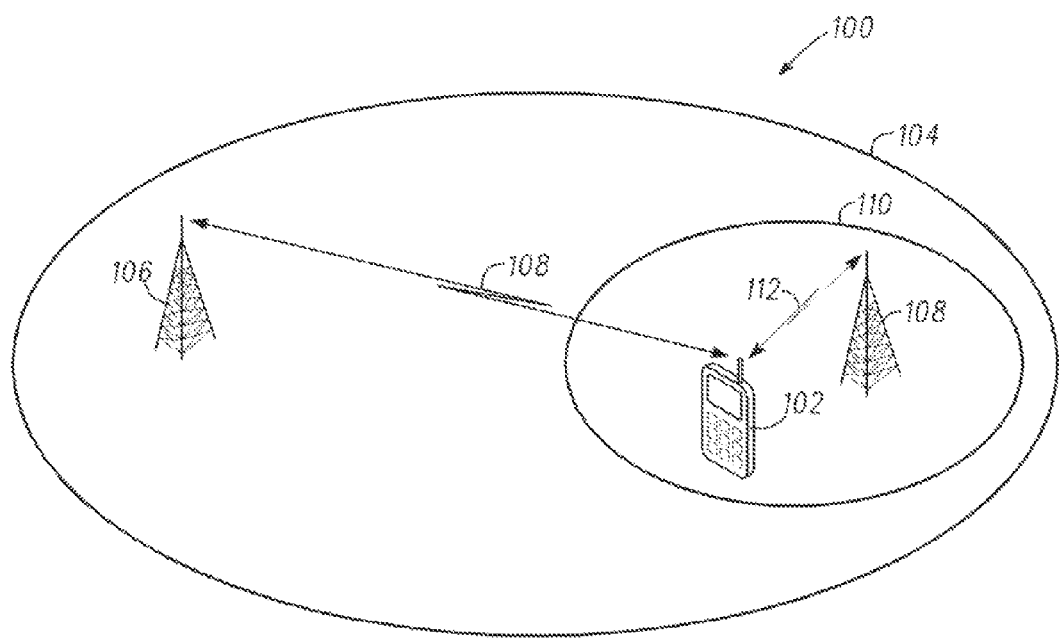
FIG. 1 is a system diagram illustrating an LTE-Advanced wireless system in accordance with some embodiments.

FIG. 1 is a system diagram illustrating an LTE-Advanced wireless system in accordance with some embodiments. FIG. 1 includes an example UE 102, which may communicate wirelessly with a PCell 104 over a wireless communication link 108. In an aspect, communication link 108 may include one or more communication channels, which may include a PUCCH, a PUSCH with DCI transmitted on the downlink (or DCI not transmitted on the downlink), and any other channel for transmitting control (e.g. scheduling or power) information or data on the uplink or downlink. Because system 100 may support carrier aggregation (e.g. may be an LTE-A system) these channels may be comprised of one or more component carriers that may be aggregated.

Furthermore, PCell 104 may be a cell associated with a macro network, such as, but not limited to, a radio access network or cellular network. For example, in some examples, PCell 104 may comprise a PCell in LTE-Advanced communication environments. In a further aspect, PCell 104 of FIG. 1 may be associated with a PCell network entity 106, which may comprise or include one or more of any type of network module, such as an access point, a macro cell, including a base station (BS), node B, eNodeB (eNB), a relay, a peer-to-peer device, an authentication, authorization and accounting (AAA) server, a mobile switching center (MSC), a radio network controller (RNC). Additionally, the network entity associated with PCell 104 may communicate with one or more other network entities of wireless and/or core networks, such as, but not limited to, wide-area networks (WAN), wireless networks (e.g. 802.11 or cellular network), the Public Switched Telephone Network (PSTN) network, ad hoc networks, personal area networks (e.g. Bluetooth®) or other combinations or permutations of network protocols and network types. Such network(s) may include a single local area network (LAN) or wide-area network (WAN), or combinations of LANs or WANs, such as the Internet.

In an aspect, the UE 102 may be a mobile device, such as, but not limited to, a smartphone, cellular telephone, mobile phone, laptop computer, tablet computer, or other portable networked device. In addition, UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In general, UE 102 may be small and light enough to be considered portable. Furthermore, UE 102 may include an uplink power manager 204, which may be configured to manage the transmission power of uplink transmissions associated with UE 102.

In a further aspect, UE 102 may communicate with one or more SCells 110 (dotted line indicating that a plurality of SCells is optional) via one or more communication links 112. In some examples, the one or more SCells 110 may include SCells in LTE-Advanced communication environments. In an aspect, UE 102 may be configured to communicate simultaneously with PCell 104 and the one or more SCells 110, for example, via a plurality of antennas of UE 102. In an aspect, communication link 108 may include one or more communication channels, which may include a PUCCH, a PUSCH with DCI transmitted on the downlink (or DCI not transmitted on the downlink), and any other channel for transmitting control (e.g. scheduling or power) information or data on the uplink or downlink.

In an aspect, SCells 110 may be small cells or low power cells, controlled by or otherwise associated with one or more network entities or modules, such as, but not limited to a low-power access point, such as a picocell, femtocell, microcell, WiFi hotspot, etc. Additionally, SCells 110 may communicate with one or more other network entities of wireless and/or core networks, such as, but not limited to, wide-area networks (WAN), wireless networks (e.g. 802.11 or cellular network), the Public Switched Telephone Network (PSTN) network, ad hoc networks, personal area networks (e.g. Bluetooth®) or other combinations or permutations of network protocols and network types. Such network(s) may include a single local area network (LAN) or wide-area network (WAN), or combinations of LANs or WANs, such as the Internet.

Additionally, system 100, which may include PCell 104 and one or more SCells 110, may comprise a Wideband Code Division Multiple Access (W-CDMA) system, and PCell 104 and one or more SCells 110 may communicate with one or more UEs 102 according to this standard. As those skilled in the art will readily appreciate, various aspects described throughout this disclosure may be extended to other telecommunication systems, network architectures and communication standards. By way of example, various aspects may be extended to other Universal Mobile Telecommunications System (UMTS) systems such as Time Division Synchronous Code Division Multiple Access (TD-SCDMA), High Speed Downlink Packet Access (HSDPA), High Speed Uplink Packet Access (HSUPA), High Speed Packet Access Plus (HSPA+) and Time-Division CDMA (TD-CDMA). Various aspects may also be extended to systems employing Long Term Evolution (LTE) (in FDD, TDD, or both modes), LTE-Advanced (LTE-A) (in FDD. TDD, or both modes), CDMA2000, Evolution-Data Optimized (EV-DO). Ultra Mobile Broadband (UMB), Institute of Electrical and Electronics Engineers (IEEE) 802.11 (Wi-Fi), IEEE 802.16 (WiMAX®), IEEE 802.20, Ultra-Wideband (UWB), Bluetooth, and/or other suitable systems. The actual telecommunication standard, network architecture, and/or communication standard employed will depend on the specific application and the overall design constraints imposed on the system. The various devices coupled to the network(s) (e.g. UE 102 and/or network entities serving PCell 104 and/or SCells 110) may be coupled to the network(s) via one or more wired or wireless connections.

In example embodiments, the UE 102 may comprise processing circuitry arranged to determine whether a total desired transmission power over a plurality of channels exceeds a total configured maximum output power for a subframe when the UE is scheduled for concurrent physical uplink control channel (PUCCH) and physical uplink shared channel (PUSCH) transmission by an enhanced node B (eNB) in the subframe. The processing circuitry may also be arranged to initially allocate a minimum proactive power to the channels. The processing circuitry may also be arranged to initially allocate any remaining power of a power budget to the channels based on priority. The UE 102 may also include a transceiver configured by the processing circuitry to transmit the channels in accordance the minimum proactive power and the remaining power allocations. In these embodiments, the PUCCH of a primary cell (PCell) is allocated power as a first priority, a physical uplink shared channel (PUSCH) with downlink control information (DCI) of the PCell is allocated power as a second priority, and the PUSCH without DCI of a secondary cell (SCell) is allocated power as a lowest priority.

In some embodiments, the processing circuitry may also compute the total power assignment from the minimum proactive power and the remaining power allocations. In Some embodiments, the processing circuitry may also initially allocate the minimum proactive power to the channels based on the priorities.

Figure 2:
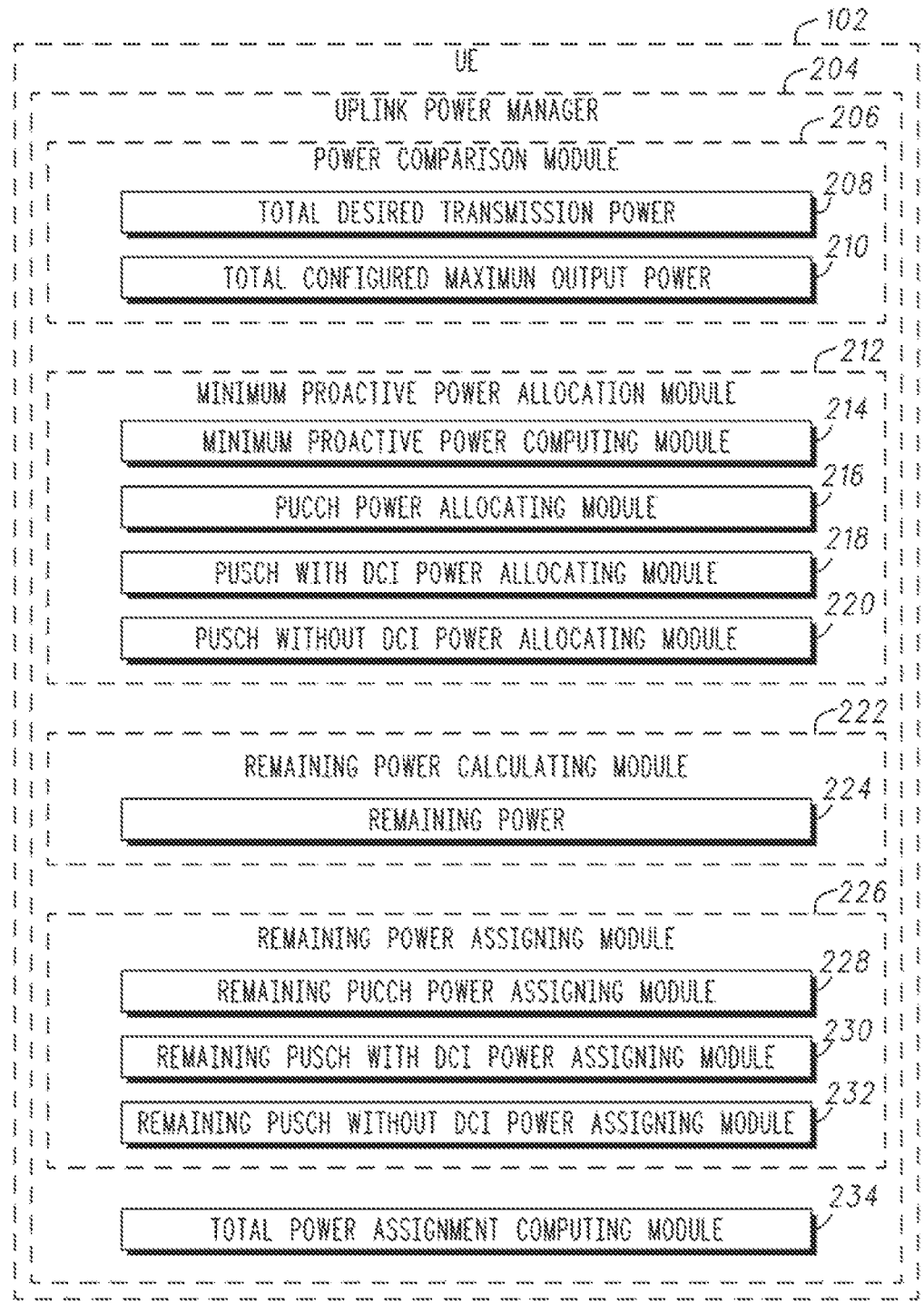
FIG. 2 is a block diagram illustrating an example UE including uplink power manager in accordance with some embodiments.

FIG. 2 is a block diagram illustrating an example UE including uplink power manager in accordance with some embodiments, which may be configured to manage uplink power allocation associated with a UE (e.g. UE 102 of FIG. 1). In an aspect, uplink power manager 204 may include a power comparison module 206, which may be configured to compare power values to determine whether a total desired transmission power 208 of the UE for a particular subframe i exceeds a total configured maximum output power 210 (represented herein as $\hat{P}_{CMAX}(i)$), for the subframe. In some examples, the total desired transmission power 208 of the UE may include the sum of multiple module transmission powers, which may include, but are not limited to: the sum of uplink PUSCH channel transmission powers to each serving cell in subframe i (represented herein as $$\sum_c \hat{P}_{PUSCH,c}(i))$$

and the transmission power value of any uplink transmission to the PCell on the PUCCH during subframe i (represented herein as $\hat{P}_{PUCCH}(i)$). In other words, power comparison module 206 may be configured to evaluate one or both of the following inequalities:

$$\sum_c \hat{P}_{PUSCH,c}(i) + \hat{P}_{PUCCH}(i) > \hat{P}_{CMAX}(i) \qquad (1)$$

$$\sum_c \hat{P}_{PUSCH,c}(i) > (\hat{P}_{CMAX}(i) - \hat{P}_{PUCCH}(i)) \qquad (2)$$

In addition, uplink power manager 204 may include a minimum proactive power allocating module 212, which may be configured to allocate a minimum proactive power, $P_{CMIN,c}$, to one or more uplink channels where power comparison module 206 determines that the total desired transmission power exceeds the total configured maximum output power. In an aspect, minimum proactive power module 212 may include a minimum proactive power computing module 214, which may be configured to compute one or more minimum proactive power values corresponding to each serving channel c, $P_{CMIN,c}$, which may be allocated to one or more uplink channels associated with a UE. In a non-limiting aspect, $P_{CMIN,c}$ may be allocated to one or more uplink channels to ensure a non-zero uplink power allocation to each such channel. Furthermore, in an aspect, the minimum proactive power $P_{CMIN,c}$ can be computed such that, when allocated and applied, it may have a minor impact to total power limitation. In one such non-limiting example, where the total power limitation is 23 dBm, the $P_{CMIN,c}$ can be set to affect a maximum 0.5 dB degradation to the 23 dBm total power limitation (e.g. $(10^\wedge(23/10))-(10^\wedge(22.5/10))=21.7$ mw=13.3 dBm). In another non-limiting aspect, the minimum proactive power $P_{CMIN,c}$ can be set as the uplink power to meet the coverage of a small cell, and may comprise one value among a set of potential configurable values (e.g. 0 dBm, 10 dBm). In an additional aspect, this value can be configurable for network optimization adjustment purposes.

In an additional aspect, minimum proactive power allocating module 212 may allocate the minimum proactive power individually to two or more channels based on priority. This priority may conform to the power priority definition of existing standards, including, but not limited to standards promulgated by the Third Generation Partnership Project (3GPP), for example, in 3GPP TS 36.213 "E-UTRA, Physical Layer Procedures," V10.6.0 and 3GPP TS 36.101 "Evolved Universal Terrestrial Radio Access (E-UTRA); User Equipment (UE) Radio Transmission and Reception," which are hereby incorporated by reference. For example, in an aspect, the uplink transmission power priority exercised by minimum proactive power allocating module 212 may allocate $P_{CMIN,c}$ to uplink channels according to the following priority:

PUCCH>PUSCH(with DCI)>PUSCH(w/o DCI)

As such, minimum proactive power allocating module may include a PUCCH power allocating module 214, which may be configured to allocate a portion of the limited uplink power budget of the UE as a first part of a PUCCH power as first priority. In a non-limiting example aspect, this first part of the PUCCH power may be allocated as a function of $P_{CMIN,c}$ in subframe i according to the following equation:

$$\hat{P}_{PUCCH\_Part1}=\min(\hat{P}_{CMAX}(i),\hat{P}_{CMAX,c}(i),\hat{P}_{PUCCH}(i), P_{CMIN,c}(i)), \quad (3)$$

where $\hat{P}_{CMIN,c}(i)$ represents the linear value of the minimum proactive power limitation defined for the serving cell c of the PUCCH (e.g. the PCell, such as PCell 104 of FIG. 1) for subframe i; and $\hat{P}_{CMAX,c}(i)$ represents the linear value of $P_{CMAX,c}(i)$, which may be defined by the requirements of a standard (e.g. 3GPP TS 36.101 "Evolved Universal Terrestrial Radio Access (E-UTRA); User Equipment (UE) Radio Transmission and Reception").

Additionally, uplink power manager 204 may include a remaining power calculating module 222, which may be configured to calculate a linear value of a remaining power, represented herein as $\hat{P}_{REMAINING}(i)$, of a limited uplink power budget for the uplink subframe i after a module of the minimum proactive power allocating module 212 allocates uplink power to one or more channels. For example, in an aspect, after PUCCH power allocating module 216 allocates $\hat{P}_{PUCCH\_Part1}$ according to Equation (3), remaining power calculating module 222 may calculate $\hat{P}_{REMAINING}(i)$ according to the following algorithm:

$$\hat{P}_{REMAINING}(i)=\max[(\hat{P}_{CMAX}(i)-\hat{P}_{PUCCH\_Part1}(i),0)] \quad (4)$$

Based on this $\hat{P}_{REMAINING}(i)$, the minimum proactive power allocating module may then allocate remaining uplink power to other channels. For example, minimum proactive power allocating module 212 may include a PUSCH with DCI power allocating module 218, which may be configured to allocate uplink power to a PUSCH channel with DCI in the downlink (e.g. a channel for data communication with the PCell, which may be a macro cell) as a second priority. In an aspect, PUSCH with DCI power allocating module 218 may allocate a first part of such a PUSCH with DCI channel uplink power based on the following equation:

$$\hat{P}_{PUSCHw/DCI\_Part1}=\min(\hat{P}_{REMAINING}(i),\hat{P}_{CMAX,c}(i), \hat{P}_{PUSCHw/DCI,c}(i),\hat{P}_{CMIN,c}(i)) \quad (5)$$

where $\hat{P}_{PUSCHw/DCI,c}(i)$ represents the total allowed uplink power for the channel. In addition, once the $\hat{P}_{PUSCHw/DCI\_Part1}$ value has been calculated by PUSCH with DCI power allocating module 218, remaining power calculating module 222 may update the remaining power 224 value, as more available power for the subframe has been allocated to the PUSCH with DCI channel(s). In an aspect, remaining power calculating module 222 may do so according to the following equation:

$$\hat{P}_{REMAINING}(i)=\max[(\hat{P}_{REMAINING}-\hat{P}_{PUSCHw/DCI\_Part1},0)] \quad (6)$$

where $\hat{P}_{REMAINING}$ represents the stored value of remaining power 224 (e.g. stored in memory) and $\hat{P}_{REMAINING}(i)$ represents the updated value of remaining power 224 after the updating.

Additionally, minimum proactive power allocating module 212 may include a PUSCH without DCI power allocating module 220, which may be configured to allocate uplink power to one or more PUSCH channels that do not transport DCI information on the downlink. In an aspect, such channels may facilitate communication between a UE and a SCell, which may be a small cell, though the present disclosure is not limited to such a scenario. Further, PUSCH without DCI power allocating module 220 may be configured to allocate remaining uplink power to such a channel as a lowest priority, or third priority, of the PUCCH, PUSCH with DCI, and PUSCH without DCI channels. For example, PUSCH without DCI power allocating module 220 may be configured to allocate a first part of a PUSCH without DCI power, $\hat{P}_{PUSCHw/oDCI\_Part1}$, according to the following algorithm:

$$\hat{P}_{PUSCHw/oDCI\_Part1}=\min(\hat{P}_{REMAINING}(i),\hat{P}_{CMAX,c}(i), \hat{P}_{PUSCHw/oDCI,c}(i),\hat{P}_{CMIN,c}(i)) \quad (7)$$

In addition, once the $\hat{P}_{PUSCHw/oDCI\_Part1}$ value has been calculated by PUSCH without DCI power allocating module 220, remaining power calculating module 222 may update the remaining power 224 value, as more available power for the subframe has been allocated to a first part of the PUSCH without DCI channel(s). In an aspect, remaining power calculating module 222 may do so according to the following equation:

$$\hat{P}_{REMAINING}(i)=\max[(\hat{P}_{REMAINING}-\hat{P}_{PUSCHw/oDCI\_Part1},0)] \quad (8)$$

where $\hat{P}_{REMAINING}$ represents the stored value of remaining power 224 (e.g. stored in memory) and $\hat{P}_{REMAINING}(i)$ represents the updated value of remaining power 224 after the updating.

In addition, uplink power manager 204 may include a remaining power assigning module 226, which may be configured to assign remaining uplink power to one or more channels after an initial power allocation, which may be performed by minimum proactive power allocating module 212. In an aspect, remaining power assigning module 226 may include a remaining PUCCH power assigning module 228, which may be configured to assign a second part of a PUCCH power, $\hat{P}_{PUCCH\_Part2}$, to the PUCCH, for example, where the first part of the PUCCH uplink transmission power. $\hat{P}_{PUCCH\_Part1}$, is less than the standard-allocated maximum PUCCH power, $P_{PUCCH}(i)$, for subframe i. In other words, remaining PUCCH power assigning module 228 may be configured to evaluate the inequality: $\hat{P}_{PUCCH\_Part1}<\hat{P}_{PUCCH}(i)$. Where this inequality is true, remaining PUCCH power assigning module 228 may be configured to set $\hat{P}_{PUCCH\_Part2}$ according to the following equation:

$$\hat{P}_{PUCCH\_Part2} = \min(\hat{P}_{REMAINING}(i), \hat{P}_{CMAX,c}(i), \hat{P}_{PUCCH}(i), \hat{P}_{PUCCH\_Part1}(i), 0) \quad (9)$$

Additionally, once the $\hat{P}_{PUCCH\_Part2}$ value has been calculated by remaining PUCCH power assigning module 228, remaining power calculating module 222 may update the remaining power 224 value, as more available power for the subframe has been allocated to the second part of the PUCCH channel(s). In an aspect, remaining power calculating module 222 may do so according to the following equation:

$$\hat{P}_{REMAINING}(i) = \max \lfloor (\hat{P}_{REMAINING} - \hat{P}_{PUCCH\_Part2}, 0) \rfloor \quad (10)$$

In a further aspect, remaining power assigning module 226 may include a remaining PUSCH with DCI power assigning module 230, which may be configured to assign a second part of a PUSCH with DCI uplink transmission power, $\hat{P}_{PUSCHw/DCI\_Part2}$, to the PUSCH with DCI channel(s) as a second priority. Remaining PUSCH with DCI power assigning module 230 may be configured to do so, for example, where the first part of the PUSCH with DCI uplink transmission power, $\hat{P}_{PUSCHw/DCI\_Part1}$, is less than the standard-allocated maximum PUSCH with DCI per-channel power, $\hat{P}_{PUSCHw/DCI,c}(i)$, for subframe i and cell c. In other words, remaining PUSCH with DCI power assigning module 230 may be configured to evaluate the inequality: $\hat{P}_{PUSCHw/DCI\_Part1} < \hat{P}_{PUSCHwe/DCI,c}(i)$. Where this inequality is true, remaining PUSCH with DCI power assigning module 230 may be configured to set $\hat{P}_{PUSCHw/DCI\_Part2}$ according to the following equation:

$$\hat{P}_{PUSCHw/DCI\_Part2} = \min(\hat{P}_{REMAINING}(i), \hat{P}_{CMAX,c}(i), \hat{P}_{PUSCHw/DCI,c}(i) - \hat{P}_{PUSCHw/DCI\_Part1}(i), 0) \quad (11)$$

Additionally, once the $\hat{P}_{PUSCHw/DCI\_Part2}$ value has been calculated by remaining PUSCH with DCI power assigning module 230, remaining power calculating module 222 may update the remaining power 224 value, as more available power for the subframe has been allocated to the second part of the PUSCH with DCI channel(s). In an aspect, remaining power calculating module 222 may do so according to the following equation:

$$\hat{P}_{REMAINING}(i) = \max[(\hat{P}_{REMAINING} - \hat{P}_{PUSCHw/DCI\_Part2}, 0)] \quad (12)$$

Moreover, remaining power assigning module 226 may include a remaining PUSCH without DCI power assigning module 232, which may be configured to assign a second part of a PUSCH without DCI uplink transmission power, $\hat{P}_{PUSCHw/oDCI\_Part2}$, to the PUSCH without DCI channel(s) as a third (or least) priority. Remaining PUSCH without DCI power assigning module 232 may be configured to do so, for example, where the first part of the PUSCH without DCI uplink transmission power, $\hat{P}_{PUSCHw/oDCI\_Part1}$, is less than the standard-allocated maximum PUSCH without DCI per-channel power, $\hat{P}_{PUSCHw/oDCI,c}(i)$, for subframe i and cell c. In other words, remaining PUSCH without DCI power assigning module 232 may be configured to evaluate the inequality: $\hat{P}_{PUSCHw/oDCI\_Part1} < \hat{P}_{PUSCHw/oDCI,c}(i)$. Where this inequality is true, remaining PUSCH without DCI power assigning module 232 may be configured to set $\hat{P}_{PUSCHw/oDCI\_Part2}$ according to the following equation:

$$\hat{P}_{PUSCHw/oDCI\_Part2} = \min(\hat{P}_{REMAINING}(i), \hat{P}_{CMAX,c}(i), \hat{P}_{PUSCHw/oDCI,c}(i) - \hat{P}_{PUSCHw/oDCI\_Part1}(i), 0) \quad (13)$$

Additionally, once the $\hat{P}_{PUSCHw/oDCI\_Part2}$ value has been calculated by remaining PUSCH without DCI power assigning module 232, remaining power calculating module 222 may update the remaining power 224 value, as more available power for the subframe has been allocated to the second part of the PUSCH without DCI channel(s). In an aspect, remaining power calculating module 222 may do so according to the following equation:

$$\hat{P}_{REMAINING}(i) = \max \lfloor (\hat{P}_{REMAINING} - \hat{P}_{PUCCHw/oDCI\_Part2}, 0) \rfloor \quad (13)$$

Additionally, uplink power manager 204 may include a total power assignment computing module 234, which may be configured to compute a total power assignment for each uplink channel scheduled to transmit uplink data in a subframe. In an aspect, total power assignment computing module 234 may be configured to compute these total power assignments by combining and/or summing component (e.g. Part 1, Part 2, and so on) power allocation or assignment values for one or more channels, which may have been assigned, allocated, and/or stored by one or more other modules of uplink power manager 204—such as, but not limited to, minimum proactive power allocating module 212 and/or remaining power assigning module 226.

For example, in an aspect, total power assignment computing module 234 may be configured to compute a total PUCCH uplink assignment value, $\hat{P}_{PUCCH\_TOTAL}$, for subframe i according to the following equation:

$$\hat{P}_{PUCCH\_TOTAL} = \hat{P}_{PUCCH\_Part1} + \hat{P}_{PUCCH\_Part2} \quad (14)$$

Likewise, total power assignment computing module 234 may be configured to compute a total PUSCH with DCI uplink assignment value, $\hat{P}_{PUSCHw/DCI\_TOTAL}$, for subframe i and for each channel c according to the following equation:

$$\hat{P}_{PUSCHw/DCI\_TOTAL} = \hat{P}_{PUSCHw/DCI\_Part1} + \hat{P}_{PUSCHw/DCI\_Part2} \quad (14)$$

Furthermore, total power assignment computing module 234 may be configured to compute a total PUSCH without DCI uplink assignment value, $\hat{P}_{PUSCHw/DCI\_TOTAL}$, for subframe i and for each channel c according to the following equation:

$$\hat{P}_{PUSCHw/oDCI\_TOTAL} = \hat{P}_{PUSCHw/oDCI\_Part1} + \hat{P}_{PUSCHw/oDCI\_Part2} \quad (16)$$

Figure 3:
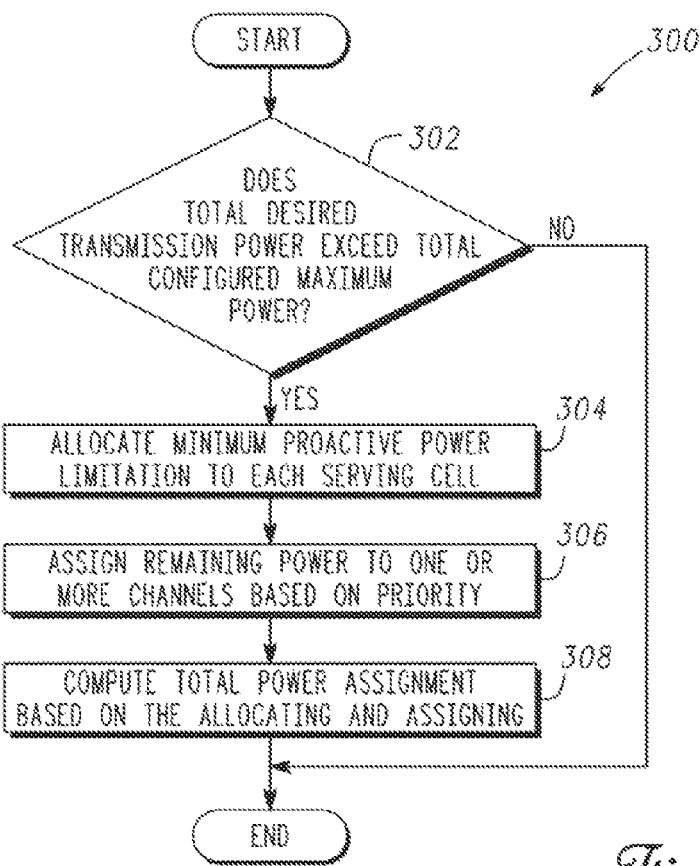
FIG. 3 is a flowchart illustrating a method for improved uplink power management in UEs in accordance with some embodiments.

FIG. 3 is a flowchart illustrating a method 300 for improved uplink transmission power management, according to some example embodiments. In some examples, method 300 and/or any of the method steps comprising method 300 may be configured to be performed by a processing apparatus, which may include UE 102 of FIG. 1, a network device (e.g. a network entity of primary or SCells of FIG. 1) and/or a method therein, for example. In some examples, method 300 may be performed during transmission scheduling procedures for each uplink transmission subframe i of a plurality of transmission subframes in a slot, frame, block, or any other transmission window, slot, or other temporal or wavelength transmission-organizing mechanism or procedure.

In an aspect, method 300 may include a decision at block 302, wherein the processing apparatus may determine whether a total desired transmission power exceeds a total configured maximum output power. Where the total desired transmission power does not exceed the total configured maximum output power (NO decision line), method 300 may proceed to end and the uplink power scheduling may proceed as normal (e.g. according to specification-defined uplink power methods and values). However, where the total desired transmission power exceeds the total configured maximum output power (YES decision line), method 300 may proceed to block 304.

In an aspect, at block 304, a processing apparatus may allocate a minimum proactive power limitation to each serving cell. In an aspect, the minimum proactive power limitation may be based on a minimum proactive power value, $P_{CMIN,c}$. In a non-limiting aspect, $P_{CMIN,c}$ may be allocated to one or more uplink channels to ensure a non-zero uplink power allocation to each such channel. Furthermore, in an aspect, the minimum proactive power $P_{CMIN,c}$ can be computed such that, when allocated and applied, it may have a minor impact to total power limitation. In another non-limiting aspect, the minimum proactive power $P_{CMIN,c}$ can be set as the uplink power to meet the coverage of a small cell, and may comprise one value among a set of potential configurable values (e.g. 0 dBm, 10 dBm). Furthermore, allocating the minimum proactive power limitation to each serving cell may comprise allocating a first part of total power assignment in the uplink for a particular cell for a subframe i. In an additional aspect, this value can be configurable for network optimization adjustment purposes.

In addition, at block 304, the minimum proactive power limitation value may be allocated based on priority, such as, but not limited to, a priority scheme that takes the form of PUCCH>PUSCH (with DCI)>PUSCH (without DCI), as described in reference to FIG. 2 above. Furthermore, the allocation of the minimum proactive power limitation may be performed according to the methods, equations, or techniques performed by minimum proactive power allocating module 212, remaining power calculating module 222, and/or any of the modules therein (see FIG. 2).

In addition, at block 306, a processing apparatus may assign remaining power to one or more channels based on priority. In an aspect, the assigning of block 306 may comprise a second part of a total transmission power for one or more uplink channels. As with the allocation at block 304, the remaining power may be assigned to one or more channels based on priority, such as, but not limited to, a priority scheme that takes the form of PUCCH>PUSCH (with DCI)>PUSCH (without DCI), as described in reference to FIG. 2 above. Moreover, the allocation of the minimum proactive power limitation may be performed according to the methods, equations, or techniques performed by remaining power assigning module 226, remaining power calculating module 222, and/or any of the modules therein (see FIG. 2).

In addition, at block 308, a processing apparatus may compute a total power assignment based on the allocating and assigning of blocks 304 and 306, respectively. In an aspect, at block 308, the processing apparatus may compute total power assignments by combining and/or summing component (e.g. Part 1, Part 2, and so on) power allocation or assignment values for one or more channels, which may have been assigned, allocated, and/or stored at blocks 304 and/or 306 of method 300. Additionally, once these total power assignments are computed at block 308, the power allocation method 300 may end and the processing apparatus may transmit one or more messages via one or more channels according to the channels' unique total power assignments allocated or otherwise computed by method 300.

Figure 4:
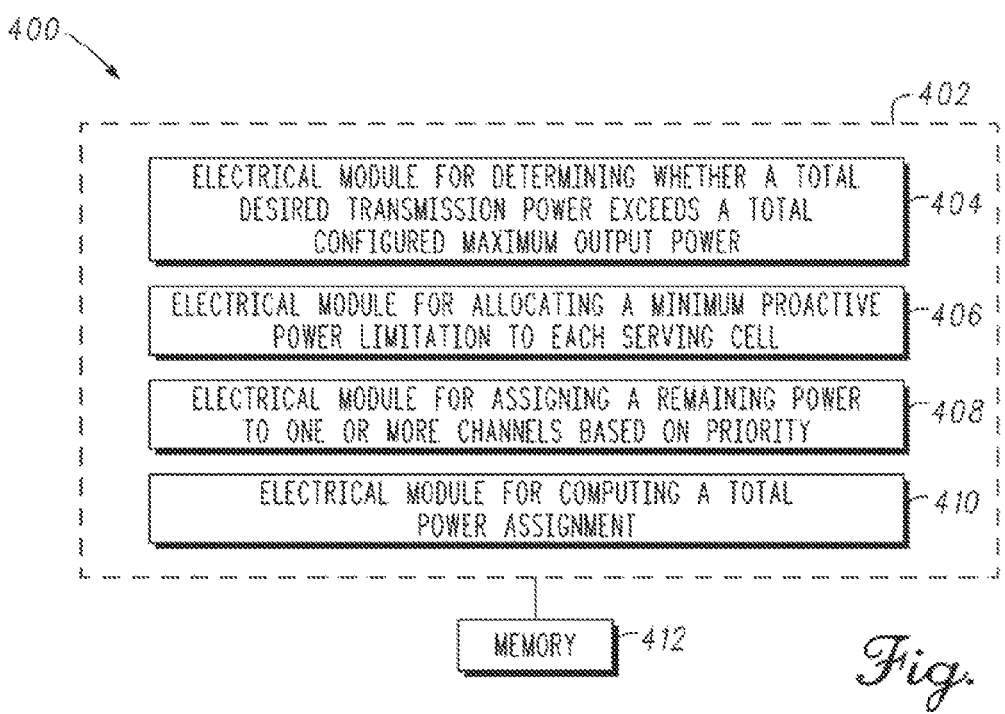
FIG. 4 is a block diagram illustrating an example system for improved uplink power management in a UE in accordance with some embodiments.

FIG. 4 is a block diagram illustrating an example system 400 for improved uplink power management in a UE in accordance with some embodiments. For example, system 400 may reside at least partially within a UE (e.g. UE 102 of FIG. 1), such as a UE or network entity (e.g. a network entity of PCell(s) 104 and/or SCell(s) 110 of FIG. 1). It is to be appreciated that system 400 is represented as including functional blocks, which may be functional blocks that represent functions implemented by a processor, software, or combination thereof (e.g. firmware). System 400 includes a logical grouping 402 of electrical modules that may act in conjunction.

For instance, logical grouping 402 may include an electrical module 404 for determining whether a total desired transmission power exceeds a total configured maximum output power. In an aspect, electrical module 404 may comprise power comparison module 206 (FIG. 2). Additionally, logical grouping 402 may include an electrical module 406 for allocating a minimum proactive power limitation to each serving cell. In an aspect, electrical module 406 may comprise minimum proactive power allocating module 212 (FIG. 2). In an additional aspect, logical grouping 402 may include an electrical module 408 for assigning a remaining power to one or more channels based on priority. In an aspect, electrical module 408 may comprise remaining power assigning module 226 (FIG. 2). Furthermore, logical grouping 402 may include electrical module 410 for computing a total power assignment. In an aspect, electrical module 410 may comprise total power assignment computing module 234 (FIG. 2).

Additionally, system 400 may include a memory 412 that retains instructions for executing functions associated with electrical modules 404, 406, 408, and 410, stores data used or obtained by electrical modules 404, 406, 408, and 410, etc. While shown as being external to memory 412, it is to be understood that one or more of electrical modules 404, 406, 408, and 410 may exist within memory 412. In one example, electrical modules 404, 406, 408, and 410 may comprise at least one processor, or each electrical module 404, 406, 408, and 410 may be a corresponding module or module of at least one processor. Moreover, in an additional or alternative example, one or more electrical modules 404, 406, 408, and 410 may be a computer program product including a computer readable medium, where the respective electrical module 404, 406, 408, and 410 may be corresponding code.

Figure 5:
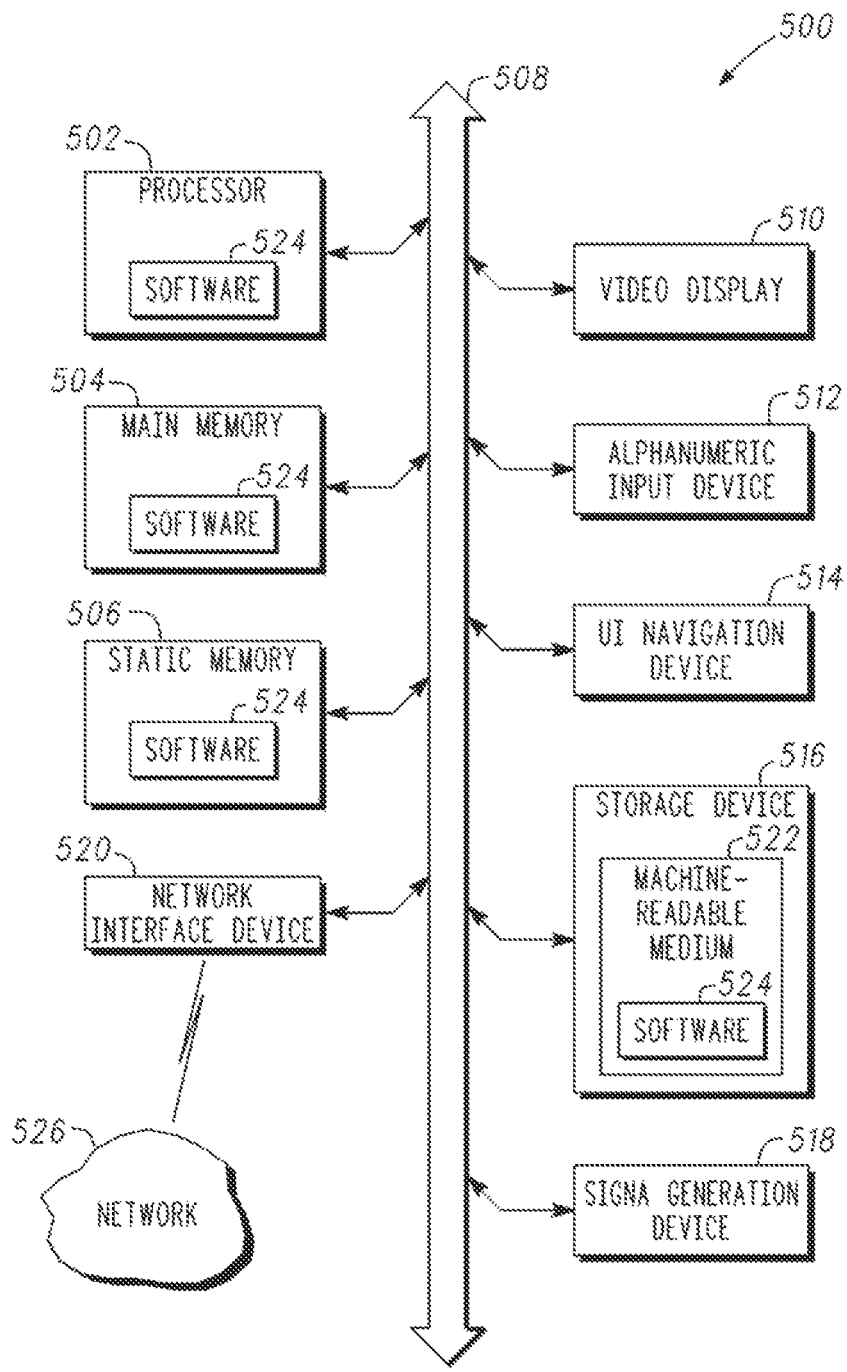
FIG. 5 is a block diagram illustrating a machine in the example form of a computer system, within which a set or sequence of instructions for causing the machine to perform any one of the methodologies discussed herein may be executed in accordance with some embodiments.

FIG. 5 is a block diagram illustrating a machine in the example form of a computer system 500, within which a set or sequence of instructions for causing the machine to perform any one of the methodologies discussed herein may be executed, according to an example embodiment. In alternative embodiments, the machine operates as a standalone device or may be connected (e.g. networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 500 includes at least one processor 502 (e.g. a central processing unit (CPU), a graphics processing unit (GPU) or both, processor cores, compute nodes, etc.), a main memory 504 and a static memory 505, which communicate with each other via a link 508 (e.g. bus). The computer system 500 may further include a video display unit 510, an alphanumeric input device 512 (e.g. a keyboard), and a user interface (UI) navigation device 514 (e.g. a mouse). In one embodiment, the video display unit 510, input device 512 and UI navigation device 514 are incorporated into a touch screen display. The computer system 500 may additionally include a storage device 515 (e.g. a drive unit), a signal generation device 518 (e.g. a speaker), a network interface device 520, and one or more sensors (not shown), such as a global positioning system (GPS) sensor, compass, accelerometer, or other sensor.

The storage device 515 includes a machine-readable medium 522 on which is stored one or more sets of data structures and instructions 524 (e.g. software) embodying or utilized by any one or more of the methodologies or functions described herein. The instructions 524 may also reside, completely or at least partially, within the main memory 504, static memory 505, and/or within the processor 502 during execution thereof by the computer system 500, with the main memory 504, static memory 505, and the processor 502 also constituting machine-readable media.

While the machine-readable medium 522 is illustrated in an example embodiment to be a single medium, the term "machine-readable medium" may include a single medium or multiple media (e.g. a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g. Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g. HTTP). Examples of communication networks include a local area network (LAN), a wide area network (WAN), the Internet, mobile telephone networks, Plain Old Telephone (POTS) networks, and wireless data networks (e.g. Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Examples, as described herein, may include, or may operate on, logic or a number of modules, modules, or mechanisms. Modules are tangible entities capable of performing specified operations and may be configured or arranged in a certain manner. In an example, circuits may be arranged (e.g. internally or with respect to external entities such as other circuits) in a specified manner as a module. In an example, the whole or part of one or more computer systems (e.g. a standalone, client or server computer system) or one or more hardware processors may be configured by firmware or software (e.g. instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the terms "module" and "module" are understood to encompass a tangible entity, be that an entity that is physically constructed, specifically configured (e.g. hardwired), or temporarily (e.g. transitorily) configured (e.g. programmed) to operate in a specified manner or to perform part or all of any operation described herein. Considering examples in which modules are temporarily configured, one instantiation of a module may not exist simultaneously with another instantiation of the same or different module. For example, where the modules comprise a general-purpose hardware processor configured using software, the general-purpose hardware processor may be configured as respective different modules at different times. Accordingly, software may configure a hardware processor, for example, to constitute a particular module at one instance of time and to constitute a different module at a different instance of time.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure. The preceding description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

ADDITIONAL NOTES & EXAMPLES

Example 1 may include subject matter (such as an apparatus, mobile apparatus, user equipment, network device, communication apparatus or device, hardware, module, or module) comprising a power comparison module configured to determine whether a total desired transmission power exceeds a total configured maximum output power for a subframe, a minimum proactive power allocating module configured to allocate a minimum proactive power limitation to each serving cell, a remaining power assigning module configured to assign a remaining power to one or more channels based on priority, a total power assignment computing module configured to compute a total power assignment based on the allocating and the assigning.

Example 2 may include, or may optionally be combined with the subject matter of Example 1 to optionally include subject matter such that the minimum proactive power allocating module is further configured to assign at least a part of a physical uplink control channel (PUCCH) power as a first priority.

Example 3 may include, or may optionally combined with the subject matter of one or both of Examples 1 or 2 to optionally include subject matter such that the minimum proactive power allocating module is further configured to assign at least a part of a physical uplink shared channel (PUSCH) with downlink control information (DCI) power as a second priority.

Example 4 may include, or may optionally combined with the subject matter of any of Examples 1-3 to optionally include subject matter such that the minimum proactive power allocating module is further configured to assign at least a part of a physical uplink shared channel without downlink control information power as a lowest priority.

Example 5 may include, or may optionally combined with the subject matter of any of Examples 1-4 to optionally include subject matter such that the remaining power assigning module is further configured to assign a remaining physical uplink control channel power as a first remaining power priority.

Example 6 may include, or may optionally combined with the subject matter of any of Examples 1-5 to optionally include subject matter such that the remaining power assigning module is further configured to assign a remaining physical uplink shared channel with downlink control information power as a second remaining power priority.

Example 7 may include, or may optionally combined with the subject matter of any of Examples 1-6 to optionally include subject matter such that the remaining power assigning module is further configured to assign a remaining physical uplink shared channel without downlink control information power as a lowest remaining power priority.

Example 2 may include, or may optionally be combined with the subject matter of Example 1 to optionally include a reset state determining module configured to determine whether a secure timer reset flag indicates a reset state, and a secure clock recovery procedure initiating module configured to initiate the secure clock recovery procedure where the secure timer reset flag indicates a reset state.

Example 3 may include, or may optionally be combined with the subject matter of Examples 1 and/or 2 to optionally include a flag setting module configured to set the secure timer reset flag where secure timer reset occurs.

Example 4 may include, or may optionally be combined with the subject matter of one or any combination of Examples 1 through 3 to optionally include a resynchronization requesting module configured to request a timer resynchronization message from a network entity.

Example 5 may include, or may optionally be combined with the subject matter of one or any combination of Examples 1 through 4 to optionally include a message receiving module configured to receive a timer resynchronization message from a network entity.

Example 6 may include, or may optionally be combined with the subject matter of one or any combination of Examples 1 through 5, wherein the timer resynchronization message is integrity protected.

Example 7 may include, or may optionally be combined with the subject matter of one or any combination of Examples 1 through 6, wherein the reset delta obtaining module is further configured to obtain the reset delta by subtracting the second secure clock time and the timer offset from the second network time.

Example 8 may include subject matter (such as a method, means for performing acts, machine readable medium including instructions that, when performed by a machine cause the machine to performs acts, or an apparatus configured to perform), which may optionally be in addition to any one or combination of Examples 1-7, comprising determining whether a total desired transmission power exceeds a total configured maximum output power for a subframe, and where the total desired transmission power exceeds the total configured maximum output power, further comprises: allocating a minimum proactive power limitation to each serving cell, assigning a remaining power to one or more channels based on priority, computing a total power assignment based on the allocating and the assigning.

Example 9 may include, or may optionally be combined with the subject matter of any of Examples 1-8 to optionally include assigning at least a part of a physical uplink control channel power as a first priority.

Example 10 may include, or may optionally be combined with the subject matter of Examples 1-9 to optionally include assigning at least a part of a physical uplink shared channel with downlink control information power as a second priority.

Example 11 may include, or may optionally be combined with the subject matter of Examples 1-10 to optionally include assigning at least a part of a physical uplink shared channel without downlink control information power as a lowest priority.

Example 12 may include, or may optionally be combined with the subject matter of Examples 1-11 to optionally include assigning a remaining physical uplink control channel power as a first remaining power priority.

Example 13 may include, or may optionally be combined with the subject matter of Examples 1-12 to optionally include assigning a remaining physical uplink shared channel with downlink control information power as a second remaining power priority.

Example 14 may include, or may optionally be combined with the subject matter of Examples 1-13 to optionally include assigning a remaining physical uplink shared channel without downlink control information power as a lowest remaining power priority.

What is claimed is:

1. User Equipment (UE) comprising:
processing circuitry arranged to:
determine whether a total desired transmission power over a plurality of channels exceeds a total configured maximum output power for a subframe when the UE is scheduled for concurrent physical uplink control channel (PUCCH) and physical uplink shared channel (PUSCH) transmission by an enhanced node B (eNB) in the subframe; and
in response to a determination that the total desired transmission power over the plurality of channels is less than the total configured maximum output power for the subframe:
initially allocate a minimum non-zero proactive power to each of the plurality of channels; and
allocate any remaining power of a power budget to the plurality of channels based on priorities of the plurality of channels, and
a transceiver configured by the processing circuitry to transmit the plurality of channels in accordance the minimum proactive power and the remaining power allocations,
wherein the PUCCH of a primary cell (PCell) is allocated power as a first priority, PUSCH with downlink control information (DCI) of the PCell is allocated power as a second priority, and a PUSCH without DCI of a secondary cell (SCell) is allocated power as a lowest priority.

2. The UE of claim 1 wherein the processing circuitry is further arranged to compute a total power assignment from the minimum proactive power and the remaining power allocations for concurrent transmission of the plurality of channels.

3. The UE of claim 2 wherein the processing circuitry is arranged to initially allocate the minimum proactive power to the plurality of channels based on the priorities.

4. The UE of claim 3 wherein the processing circuitry is arranged to determine whether the total desired transmission power over the plurality of channels exceeds a total configured maximum output power for component carriers in the PCell and SCell.

5. The UE of claim 4 wherein at least some of the component carriers are aggregated.

6. The UE of claim 4 wherein data traffic is offloaded to the PUSCH without DCI of the SCell, and the PUCCH of PCell and the PUSCH with DCI of the PCell is used for communicating management and control information with the eNB, and wherein the processing circuitry is arranged to determine whether the total desired transmission power exceeds the total configured maximum output power for the subframe when the UE is scheduled for concurrent PUCCH and PUSCH in the PCell and PUSCH in the SCell transmission in the subframe.

7. The UE of claim 1 wherein the eNB is a primary eNB associated with the PCell, and wherein the UE and the primary eNB communicate in accordance with an OFDMA technique in accordance with one of the 3GPP LTE standards.

8. The UE of claim 1 wherein the processing circuitry is arranged to offload uplink data transmissions to the SCell while ensuring that uplink control signaling to the PCell remains intact when the total desired transmission power exceeds the total configured maximum output power.

9. A method of uplink power management in user equipment (UE), the method comprising:

determining whether a total desired transmission power over a plurality of channels, each of the plurality of channels associated with a primary cell (PCell) or one or more secondary cells (SCells), exceeds a total configured maximum output power for a subframe when the UE is scheduled for concurrent physical uplink control channel (PUCCH) and physical uplink shared channel (PUSCH) transmission by an enhanced node B (eNB) in the subframe, and where the total desired transmission power exceeds the total configured maximum output power; and in response to determining that the total desired transmission power over the plurality of channels is less than the total configured maximum output power for the subframe:

initially allocating a minimum non-zero proactive power to the PCell and one or more SCells associated with the UE;

assigning a remaining power of a power budget to one or more channels based on priorities of the one or more channels;

transmitting the one or more channels in accordance the minimum non-zero proactive power and the remaining power allocations; and computing a total power assignment based on the allocating and the assigning, wherein the total power assignment governs an uplink power allocated to the one or more channels, and wherein the PUCCH of the primary cell is allocated power as a first priority, a PUSCH with downlink control information (DCI) of the PCell is allocated power as a second priority, and a PUSCH without DCI of the one or more of the SCells associated with the UE is allocated power as a lowest priority.

10. The method of claim 9, wherein assigning a remaining power to one or more channels based on priority further comprises assigning a remaining PUCCH power as a first remaining power priority.

11. The method of claim 10, wherein assigning a remaining power to one or more channels based on priority further comprises assigning a remaining PUSCH with downlink control information (DCI) power as a second remaining power priority.

12. The method of claim 11, wherein assigning a remaining power to one or more channels based on priority further comprises assigning a remaining PUSCH without downlink control information (DCI) power as a lowest remaining power priority.

13. A non-transitory machine readable storage medium comprising instructions that in response to being executed, cause processing circuitry to:

determine whether a total desired transmission power over a plurality of channels exceeds a total configured maximum output power for a subframe when a user equipment (UE) is scheduled for concurrent physical uplink control channel (PUCCH) and physical uplink shared channel (PUSCH) transmission by an enhanced node B (eNB) in the subframe; and in response to a determination that the total desired transmission power over the plurality of channels is less than the total configured maximum output power for the subframe:

initially allocate a minimum non-zero proactive power to the plurality of channels; and allocate any remaining power of a power budget to the plurality of channels based on priorities of the plurality of channels, wherein the PUCCH of a primary cell (PCell) is allocated power as a first priority, a PUSCH with downlink control information (DCI) of the PCell is allocated power as a second priority, and a PUSCH without DCI of a secondary cell (SCell) is allocated power as a lowest priority.

14. The non-transitory machine readable storage medium of claim 13 wherein the processing circuitry is further arranged to compute the total power assignment from the minimum proactive power and the remaining power allocations.

15. The non-transitory machine readable storage medium of claim 14 wherein the processing circuitry is arranged to initially allocate the minimum proactive power to the plurality of channels based on the priorities.

16. The non-transitory machine readable storage medium of claim 15 wherein the processing circuitry is arranged to determine whether the total desired transmission power over the plurality of channels exceeds a total configured maximum output power for all component carriers in the PCell and SCell.

17. User equipment (UE) comprising:

one or more antennas;

processing circuitry arranged to:

determine whether a total desired transmission power over a plurality of channels exceeds a total configured maximum output power for a subframe when the UE is scheduled for concurrent physical uplink control channel (PUCCH) and physical uplink shared channel (PUSCH) transmission by an enhanced node B (eNB) in the subframe; and in response to a determination that the total desired transmission power over the plurality of channels is less than the total configured maximum output power for the subframe:

initially allocate a minimum non-zero proactive power to the channels; and allocate any remaining power of a power budget to the channels based on priority, and a transceiver coupled to the one or more antennas and configured by the processing circuitry to transmit the channels in accordance the minimum proactive power and the remaining power allocations, wherein the PUCCH of a primary cell (PCell) is allocated power as a first priority, a PUSCH with downlink control information (DCI) of the PCell is allocated power as a second priority, and a PUSCH without DCI of a secondary cell (SCell) is allocated power as a lowest priority.

* * * * *